United States Patent
Weidner

[15] 3,636,992
[45] Jan. 25, 1972

[54] METHOD AND APPARATUS FOR CHARGING A THERMOSTATIC SYSTEM

[72] Inventor: Eric Weidner, Augustenborg, Denmark
[73] Assignee: Danfoss A/S, Nordborg, Denmark
[22] Filed: May 11, 1970
[21] Appl. No.: 36,000

[30] Foreign Application Priority Data

May 7, 1969 Germany..................P 19 23 370.6

[52] U.S. Cl....................................141/4, 141/11, 141/82, 222/3, 222/450
[51] Int. Cl..........................................B65b 31/00
[58] Field of Search.....................73/368.2, 368.4, 368.6, 23, 73/421.5; 141/1–5, 7–9, 11, 18, 20, 31, 37, 39, 47, 49, 63, 61, 66, 82, 104, 197; 222/3, 5, 57, 14, 21, 450

[56] References Cited

UNITED STATES PATENTS

| | | |
|---|---|---|
| 2,527,136 | 10/1950 | Kagi et al.........................222/57 X |
| 2,846,118 | 8/1958 | Matejka.............................222/3 |
| 2,475,317 | 7/1949 | Gess..................................141/7 |
| 2,684,805 | 7/1954 | McBean...........................141/9 X |

Primary Examiner—Edward J. Earls
Attorney—Wayne B. Easton

[57] ABSTRACT

A method and apparatus for charging a thermostatic system with a condensable fluid. Essential parts of the apparatus are a storage container for the condensable fluid, a metering container and a charging head. The condensable fluid in the storage container exerts a vapor pressure and, with the use of valve means, vaporized fluid is caused to flow to the metering container until a first predetermined pressure is reached. With the use of other valve means vaporized fluid in the metering container is caused to flow through the charging head to the thermostatic system to be charged until a second lower predetermined pressure is reached. A reducing valve is between the storage container and the metering container to effect a superheated condition for the fluid flowing to the metering container.

5 Claims, 1 Drawing Figure

PATENTED JAN25 1972　　　　　　　　　　　　　　3,636,992
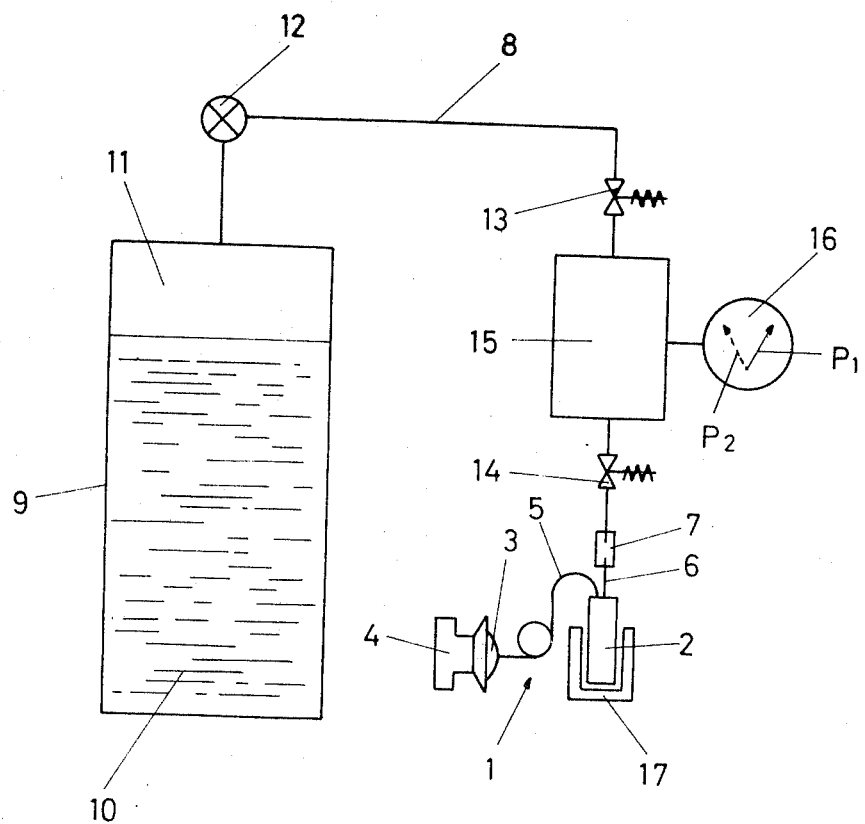

METHOD AND APPARATUS FOR CHARGING A THERMOSTATIC SYSTEM

The invention relates to a method of charging a thermostatic system with a predetermined quantity of a noncondensible medium derived from a storage container, and particularly systems for relief valve jets; the invention also relates to charging apparatus for performing this method.

It is known practice to charge thermostatic systems which consist for example of a temperature sensor and a working element connected thereto, through a capillary tube, with a condensable medium. The condensable media include sulphur dioxide and halogenized hydrocarbons such as methyl chloride or the substances marketed under the trade names Freon or Frigen. In the working range they form a liquid-vapor charge, the vapor pressure of which is dependent upon temperature.

The usual charging methods do not however enable very small quantities of a condensable medium to be charged into a thermostatic system in a precise manner. Pressure-limited thermostatic systems for example contain, at the lowest working temperature, only a few drops of condensate, which must be completely evaporated just above the temperature working range in order not to subject the system to excessive pressure loading when a further rise in temperature takes place. If the amount of the charge is only slightly smaller, the working range is limited, and if the amount of the charge is only slightly greater, undesirable pressure loading occurs. A typical example of a relief valve jet of this kind is an expansion valve for refrigerating plant, the sensor of which is subjected to tropical temperatures during transport.

The object of the invention is to provide a method of charging with the help of which it is possible to supply a thermostatic system with condensable medium in a precise manner even when the quanitity of the medium is extremely small.

According to the invention this object is achieved by passing the medium in the superheated condition to a measuring container until a predetermined first pressure obtains in this container, and by then releasing the medium from the container into the thermostatic system until a predetermined lower second pressure obtains in the measuring container.

Since the measuring container has a definite volume, the predetermined change in pressure corresponds to a precisely defined quantity of condensable medium. The method can be repeated to give the same results and indicates accurately what quantity of the medium is removed from the measuring container on each occasion.

The superheated medium can only flow into the thermostatic system because of the difference between the pressure in the measuring container and the pressure or partial pressure in the thermostatic system. A particularly rapid mode of operation results if at least part of the thermostatic system is so cooled during the charging operation that the medium condenses in that part.

It is also expedient for the medium to be stored under pressure in the liquid condition in the storage container and for the pressure to be relaxed prior to entry of the medium into the measuring container. After the pressure has been relaxed, the medium is available in a sufficiently superheated condition to enable the metering operation to proceed in a methodical manner. The measuring container can be kept at room temperature, and therefore does not need to be heated.

According to the invention, charging apparatus for performing the method is characterized in that a measuring container having an inlet valve, an outlet valve and a pressure gauge is disposed in the line extending between the storage container and a charging head for connecting the thermostatic system. Depending upon the indication given by the pressure gauge, the inlet valve for filling the measuring container can then be opened and closed, and the outlet valve can be opened and closed for feeding the medium.

This procedure can even be rendered automatic if the pressure gauge actuates contacts which close the inlet valve at the predetermined first pressure, and if required, open the outlet valve, and close the outlet valve at the predetermined second pressure and, if required, open the inlet valve. Charging can be carried out for example on an assembly line using a phased method, wherein the time required for filling the measuring container is used each time for replacing the charged thermostatic system by an empty one.

A reducing valve is expediently fitted between the storage container and the inlet valve. This reducing valve provides the reduction of pressure required for superheating. Furthermore, it is advantageous for the pipe to run from the vapor compartment of the storage container, so that the reducing valve has only to handle vapor.

A very broad meaning is applied to the expression "pressure gauge." It can consist for example of two separate pressostats, one of which controls the inlet valve and the other the outlet valve. If the reducing valve is able to keep the pressure on the outlet side constant, this valve takes over part of the function of the pressure gauge.

The method is also suitable for charging such thermostatic systems which, apart from the above-mentioned condensable medium, also contain another medium, e.g., a noncondensible medium.

The invention will now be explained in more detail by reference to an embodiment illustrated schematically in the drawing.

It will be assumed that it is required to charge a thermostatic system 1, which comprises a sensor 2, a siphon diaphragm 3 on a valve 4, and a capillary tube 5. A further short capillary tube 6 is used as a temporary connection on the charging head 7. The charging head 7 is connected through a pipe 8 to a storage container 9, which contains a condensable medium 10 in liquid form. The pipe 8 runs from the vapor compartment 11 of this container, passes through a reducing valve 12 and, between an inlet valve 13 and an outlet valve 14, incorporates a measuring container 15, to which a pressure gauge 16 is connected. The sensor 2 is accommodated in a cooling container 17 which keeps the sensor at a low temperature. It will be assumed that all parts of the system are held at room temperature, whereas the sensor is held at a considerably lower temperature by the cooling container 17.

To charge the system 1, first the valve 13 is opened, valve 14 being closed. Medium in vapor form then flows through the reducing valve 12, is reduced in pressure and gradually builds up a pressure in the measuring container 15. If the pressure gauge 16 indicates a pressure of $p_1$, the valve 13 is closed by hand or automatically.

Since substantially all of the quantity of the medium drawn from the container 15 is contained in the system 1 (very small traces of vapor in that portion of the pipe between the measuring container 15 and the system 1 can be ignored), the charging port 6 can be removed from the charging head 7 and sealed. This cycle can then be repeated with a fresh system.

I claim:

1. A method for charging a thermostatic system with a predetermined quantity of a condensable medium comprising the steps of storing a condensable medium in a fluidtight storage container, placing the upper part of said storage container in fluid communication with a metering container until a first predetermined pressure in said metering container is reached, maintaining said metering container at room temperature, placing said metering container in fluid communication with a fluid containing part of a thermostatic system until a second lower predetermined pressure is reached in said metering container.

2. A method according to claim 1 including the step of superheating said medium at a point between said storage container and said metering container.

3. A method according to claim 1 including the step of cooling said fluid containing part of said system.

4. Apparatus for charging a thermostatic system with a predetermined quantity of a condensable medium comprising a storage container for storing a quantity of a condensable medium, a metering container, a charging head, first conduit means between said storage container and said metering container, second conduit means between said metering container and said charging head, valve means in said first and second conduit means, and pressure responsive means connected to said metering container for operating said valves.

5. Apparatus according to claim 4 including a reducing valve in said first conduit means between said storage container and said valve means in said first conduit means.

* * * * *